March 31, 1964     H. P. MARKANT     3,127,237
CONVERSION OF POTASSIUM SULPHATE TO POTASSIUM CARBONATE
Filed April 27, 1959
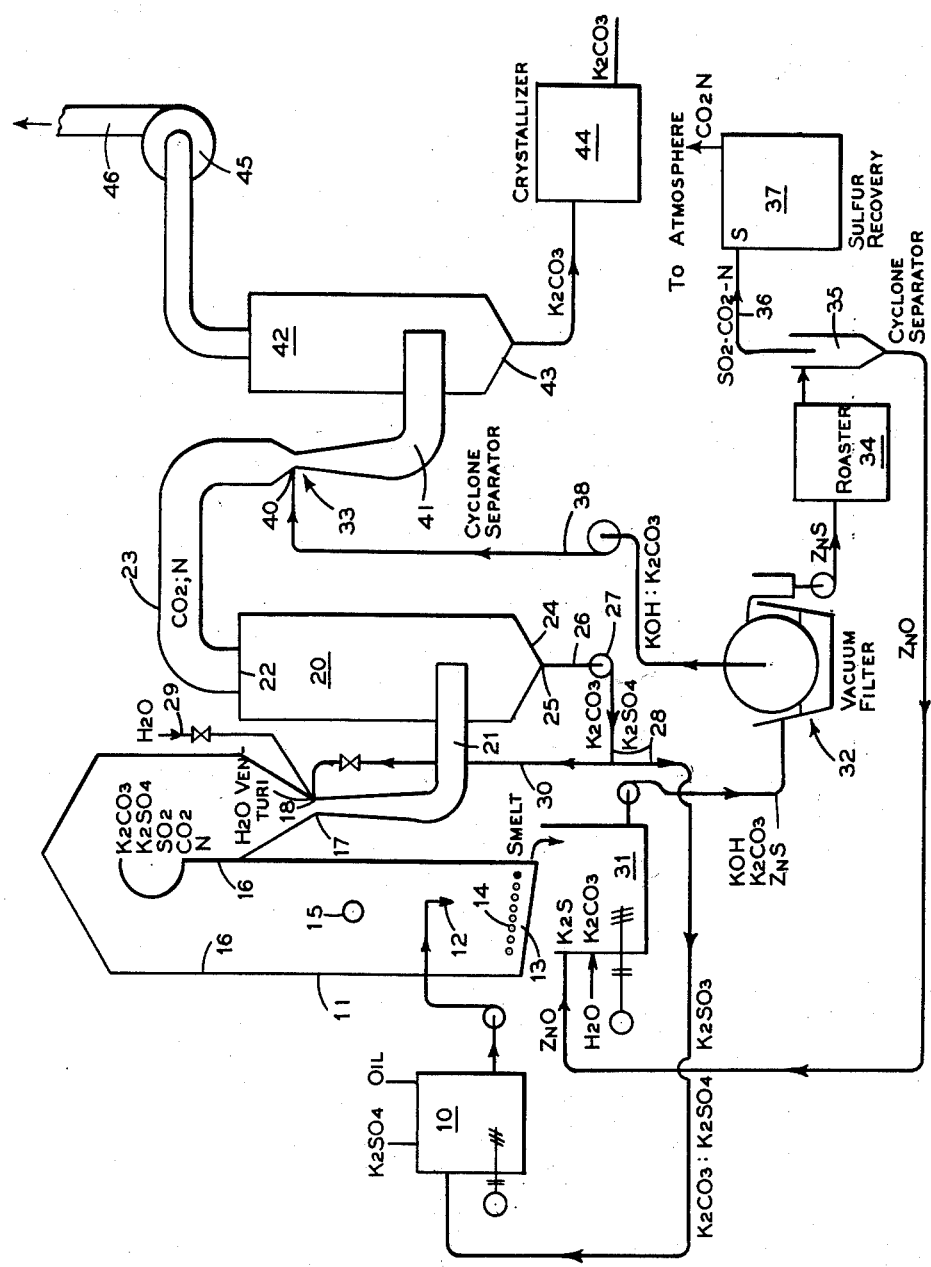
INVENTOR.
Henry P. Markant
BY
*J. Moran*
ATTORNEY 3,127,237
CONVERSION OF POTASSIUM SULPHATE TO POTASSIUM CARBONATE
Henry P. Markant, Alliance, Ohio, assignor to The Babcock & Wilcox Company, New York, N.Y., a corporation of New Jersey
Filed Apr. 27, 1959, Ser. No. 809,288
3 Claims. (Cl. 23—63)

The present invention relates to a thermochemical process for the conversion of potassium sulphate to potassium carbonate, and more particularly to the thermal conversion of potassium sulphate to potassium sulphide, and the chemical conversion of the potassium sulphide to potassium carbonate.

In the invention, potassium sulphate is heated under reducing conditions with carbon to produce a reaction wherein a resultant molten smelt including potassium sulphide and potassium carbonate is produced. The reaction also releases gaseous products including sulphur dioxide and carbon dioxide with entrained particles of potassium carbonate and potassium sulphate which are suspended in the gases.

The molten smelt discharged from the thermal portion of the reaction is dissolved in water in the presence of a metal oxide, preferably zinc oxide to form an insoluble precipitate of zinc sulphide and a liquid solution containing potassium hydroxide and potassium carbonate. Thereafter, the insoluble zinc sulphide is separated from the liquid solution by filtration, for example, with the separated zinc sulphide precipitate roasted for the production of zinc oxide for reuse in the process and the gases formed during the roasting process, including sulphur dioxide, exhausted to the atmosphere or, if desired, processed for the recovery of the sulphur.

The hot gases resulting from the incineration of the potassium sulphate are cooled by heat exchange with a vaporizable fluid, such as in the generation of steam, and thereafter passed through a zone of intimate contact with a liquid spray for absorption of the sulphur dioxide. The intimate contact between the gases and the spray results in a gas and liquid mixture which is subjected to centrifugal forces for the separation of the liquids and solids from the gases. The liquids are returned to the incineration process for the smelting of the potassium compounds therein while the separated gases, consisting essentially of carbon dioxide and nitrogen are thereafter subjected to a second stage or carbonating zone of intimate mixing with a liquid spray. The liquid spray mixture in the second stage consists of the filtrate resulting from the smelt of the incineration process with the potassium hydroxide combining with the gaseous carbon dioxide to form potassium carbonate which is separated from the residual gases of the second stage of intimate gas and liquid contact to obtain the finished product which may be processed for use as the end product of the overall process.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described a preferred embodiment of the invention.

The single sheet of drawings illustrates an arrangement of equipment suitable for performing the process of the invention.

As shown in the drawing, the invention is illustrated as a thermochemical process wherein the potassium sulphate is treated in a smelter or incinerating furnace 11 to remove the sulphur compounds from the potassium in the form of parallel liquid and gaseous sulphur separation steps. Thereafter, the substantially sulphur free liquid and gaseous products of the incineration step are chemically recombined to carbonate a potassium hydroxide solution to form potassium carbonate.

Potassium sulphate enters the process as a particulate solid which is emulsified with oil in a mixing tank 10 to form a liquid of a consistency capable of being sprayed into a smelter type furnace 11. In forming the emulsion, sufficient oil is combined with the sulphate to provide the carbon necessary for the thermal reduction process. In the incinerating furnace 11, the emulsified liquid is discharged in a downward direction from a nozzle 12 toward the furnace hearth 13 where, under proper temperature range and the controlled admission of air through ports 14, the potassium sulphate and oil is reduced to form a smelt containing potassium sulphide and potassium carbonate. To attain the temperatures necessary for the smelting process, an oil burner 15, or other means for adding fuel, is provided in the furnace at a position above the spray nozzle 12 inlet. The incineration of the emulsified mixture of oil and potassium sulphate also produces gaseous products which include potassium carbonate, potassium sulphate, sulphur dioxide and carbon dioxide, in addition to the inert nitrogen admitted with the combustion air. The hot gaseous products of the smelting process are cooled by heat exchange with fluid cooled tubes lining the walls 16 of the smelter furnace 11.

The furnace and vapor generating equipment utilized for the reduction of the potassium sulphate may be of the general type shown in U.S. Patent 2,879,838.

The gaseous products discharged from the smelting furnace 11 are passed through a first stage of contact with a sprayed liquid for cooling of the gases and coincidental absorption of the sulphur dioxide from the gases. In the example of the invention illustrated in the drawing, the spray contact is attained in a venturi type scrubber 17 of the general type disclosed in said U.S. Patent 2,879,838. As disclosed in said patent, the liquid is projected as a spray from nozzle 18 into the throat of the venturi 17 to attain intimate physical contact between the liquid and the gases. Thereafter, the entrained matter, i.e. the solids and liquids suspended in the gases, is removed in a cyclone separator 20 positioned immediately downstream from the venturi scrubber and connected thereto by a duct 21.

The separator 20 is of circular horizontal cross-section and tangentially receives the liquid laden gases from the duct 21 for centrifugal separation of the liquids and solids from the gases. The gases are discharged from the separator 20 through an axially located upper gas outlet 22 and thence through a duct 23, while substantally all of the solids and liquids accumulate in an inverted frustoconical hopper 24 at the bottom, with the accumulation discharged as a liquid through an outlet 25. The liquid, which contains potassium compounds removed from the gases is withdrawn from the outlet 25 through a pipe 26 by a pump 27 for discharge through pipe 28 to the mixing tank 10. A controlled amount of the liquid may be diverted through a valved conduit 30 for re-introduction through the nozzles of the venturi-type scrubber, this recirculation producting a further concentration of the liquid. Water is added through the valved tube 29 to the nozzles 18 as indicated on the drawing, which in combination with the recirculated liquid, controls the viscosity of the liquid discharge and regulates the temperature of the combustion gases.

The spray liquid introduced through the nozzles 18 is thus made up largely of water supplemented by minor amounts of the solids recovered in the cyclone to and in the absorption of sulphur dioxide. The recirculated mixture of water, potassium sulphate and potassium carbonate recycled to the spray nozzles 18 represents a relatively minor portion of the total solution recovered in the cyclone separator 20. The major recovered portion is returned to the mixing tank 10 for recycling through the smelting furance 11. The gases leaving the cyclone separator 20 are predominantly composed of carbon dioxide and nitrogen, with some slight amounts of other entrained chemical products.

While the gases are being treated for the removal of $SO_2$ and entrained solids, the smelt discharged from the furnace 11 is passed to a dissolving tank 31 where the potassium sulphide and potassium carbonate in the smelt are mixed with water and zinc oxide, all of which chemically react to form a solution predominantly including potassium hydroxide, potassium carbonate, and zinc sulphide. The zinc sulphide is insoluble and forms a solid precipitate which may be removed from the solution by a vacuum filter 32 or, if desired, by centrifugal separation. The filtrate leaving the vacuum filter 32 will include potassium hydroxide and potassium carbonate. It is delivered by conduit 38 to a second stage of gas and liquid contact with the liquid resulting from the treatment of the smelt combining in a second stage venturi scrubber 33 with the treated gases from cyclone separator 20.

The solid residue discharged from the vacuum filter 32 consists essentially of zinc sulphide which may be passed to a roaster 34 where the zinc sulphide is reconverted to zinc oxide for reuse in the process. The roasting of the zinc sulphide is exothermic with the sulphur from the process leaving the roaster 34 in the form of $SO_2$. In addition to the sulphur dioxide, the gaseous products leaving the roaster will include carbon dioxide and nitrogen which may, if desired, be passed through a cyclone separator 35 and conduit 36, thence to a sulphur recovery unit, generally indicated at 37, for the conversion of the sulphur dioxide to usable sulphur compounds. In some instances, the amount of sulphur involved is insufficient to economically justify the recovery of the sulphur and under these conditions the gaseous mixture may be exhausted to the atmosphere.

As shown in the drawing, the gaseous products leaving the roaster are passed through a cyclone separator 35 to remove the dust and thereafter are passed through a duct 36 to an absorption tower where the $SO_2$ gases are contacted by a brine solution with the sulphur largely absorbed in the brine.

The filtrate from the vacuum filter 32 comprises a liquid solution containing potassium hydroxide and potassium carbonate and is pumped through a pipe 38 to spray nozzles 40 positioned in the throat of the second stage venturi-scrubber. The intimate mixing contact between the liquid and the gas converts the potassium hydroxide to potassium carbonate.

The mixture of gases with entrained solids and liquids is passed through a duct 41 from the venturi-scrubber 33 into a cyclone separator 42 where the potassium carbonate, predominantly in liquid form, is discharged from the bottom 43 of the cyclone separator 42 and passed to a crystalizer 44, or its equivalent, for the recovery of the potassium carbonate in solid crystalline form. The crystals are thereafter stored or bagged for shipment as the end product of the process. The residual gases leaving the cyclone separator are passed through a fan 45 and the ducts 46 to the atmosphere and are predominantly composed of nitrogen with some minor percentage of potassium carbonate dust and/or carbon dioxide present in the exhaust gases.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a thermochemical reaction process for the conversion of potassium sulphate to potassium carbonate the steps comprising incinerating potassium sulphate in the presence of carbon and under reducing conditions to obtain a molten smelt including potassium sulphide and a hot gaseous product including carbon dioxide and sulphur dioxide, discharging the smelt into an aqueous solution containing zinc oxide to form insoluble zinc sulphide and a solution of potassium hydroxide and potassium carbonate, separating the insoluble zinc sulphide from said solution, passing the hot gaseous products of said incinerating step through a first liquid-gas contact zone to remove the entrained solid matter therefrom and to absorb the sulphur dioxide in said gases, returning the removed matter and absorbed $SO_2$ to said incinerating step, directing said gaseous products of incineration from said first contact zone through a second liquid-gas contact zone, passing said solution of potassium hydroxide and potassium carbonate in contact with said gaseous mixture containing carbon dioxide in said second contact zone to carbonate said potassium hydroxide to potassium carbonate, and separating said potassium carbonate from the gases leaving said second contact zone.

2. In a thermochemical reaction process for the conversion of potassium sulphate to potassium carbonate the steps comprising mixing potassium sulphate with water and oil to form an emulsion, incinerating said emulsion under reducing conditions to obtain a molten smelt including potassium sulphide and a hot gaseous product including carbon dioxide and sulphur dioxide, discharging the smelt into an aqueous solution containing zinc oxide to form insoluble zinc sulphide and a solution of potassium hydroxide and potassium carbonate, separating the insoluble zinc sulphide from said solution, passing the gaseous products of said incinerating step through a liquid spray contact zone to remove the entrained solid matter therefrom and to absorb the sulphur dioxide in said gases, separating said liquid with entrained matter from the gases leaving said spray contact zone, passing said separated liquid to said potassium sulphate mixing step, directing said gaseous products of incineration from said first spray contact zone through a second spray contact zone, passing said solution of potassium hydroxide and potassium carbonate in spray contact with said gaseous mixture containing carbon dioxide in said second spray contact zone to carbonate said potassium hydroxide to potassium carbonate, and separating said potassium carbonate from the gaseous leaving said second zone.

3. In a thermochemical reaction process for the conversion of potassium sulphate to potassium carbonate the steps comprising forming a mixture of potassium sulphate and carbon with water, incinerating said mixture partially in suspension under reducing conditions to obtain a molten smelt including potassium sulphide and gaseous products of combustion including carbon dioxide, discharging the smelt into an aqueous solution containing zinc oxide to form an insoluble zinc sulphide and a solution of potassium hydroxide and potassium carbonate, separating the insoluble zinc sulphide from said solution, passing the gaseous products of said incinerating step through a spray contact zone to remove substantially all of the fluent sulphur compounds therefrom, directing said substantially sulphur free gaseous products of incineration through a second spray contact zone, passing said solution of potassium hydroxide and potassium carbonate in spray contact with said gaseous mixture containing carbon dioxide in said second spray contact zone to carbonate said potassium hydroxide to potassium carbonate, and separating said potassium carbonate from the gases leaving said second zone.

(References on following page)

References Cited in the file of this patent

UNITED STATES PATENTS

| | | |
|---|---|---|
| 1,562,891 | Klopstock et al. | Nov. 24, 1925 |
| 2,054,727 | Lundin | Sept. 15, 1936 |
| 2,164,141 | Moore | June 27, 1939 |
| 2,383,247 | Gardner | Aug. 21, 1945 |
| 2,903,336 | Gloss et al. | Sept. 8, 1959 |

OTHER REFERENCES

Mellot: "Comprehensive Treatise on Inorganic and Theoretical Chemistry," Longmans, Green & Company, vol. 2, 1922, page 718.